United States Patent [19]

Hebert

[11] 4,213,448

[45] Jul. 22, 1980

[54] THERMOSIPHON SOLAR SPACE HEATING SYSTEM WITH PHASE CHANGE MATERIALS

[76] Inventor: Raymond T. Hebert, P.O. Box 134, Saratoga, Calif. 95070

[21] Appl. No.: 936,375

[22] Filed: Aug. 24, 1978

[51] Int. Cl.² .............................................. F24J 3/02
[52] U.S. Cl. .................................. 126/434; 126/436; 126/437; 165/106; 165/104 S; 126/400
[58] Field of Search .............. 126/270, 271, 400, 434, 126/436, 437, 450; 237/1 A; 165/106, 104 S, 18, 48

[56] References Cited

U.S. PATENT DOCUMENTS

| | | | |
|---|---|---|---|
| 2,677,664 | 5/1954 | Telkes | 126/270 |
| 3,987,782 | 10/1976 | Meier, Jr. | 126/271 |
| 4,003,367 | 1/1977 | Wikholm | 126/271 |
| 4,050,508 | 9/1977 | Buckley | 126/271 |
| 4,127,103 | 11/1978 | Klank | 126/271 |

*Primary Examiner*—James C. Yeung
*Attorney, Agent, or Firm*—Robert B. Block

[57] ABSTRACT

A fluid thermosiphon system including a heat collection channel in communication above and below an insulating member to a heat storage region in a closed loop, the storage region includes spaced apart panels of an entirely encapsulated phase change material between which the heated fluid flows. The panels are adjacent the rear wall of the unit through which they disperse retained heat to the space. A wall or tilted roof unit suitable for built-in construction is disclosed, as is an exterior ground supported add-on unit. A liquid thermosiphon system is disclosed as the preferred embodiment. A gaseous system, using air, is also disclosed.

21 Claims, 6 Drawing Figures

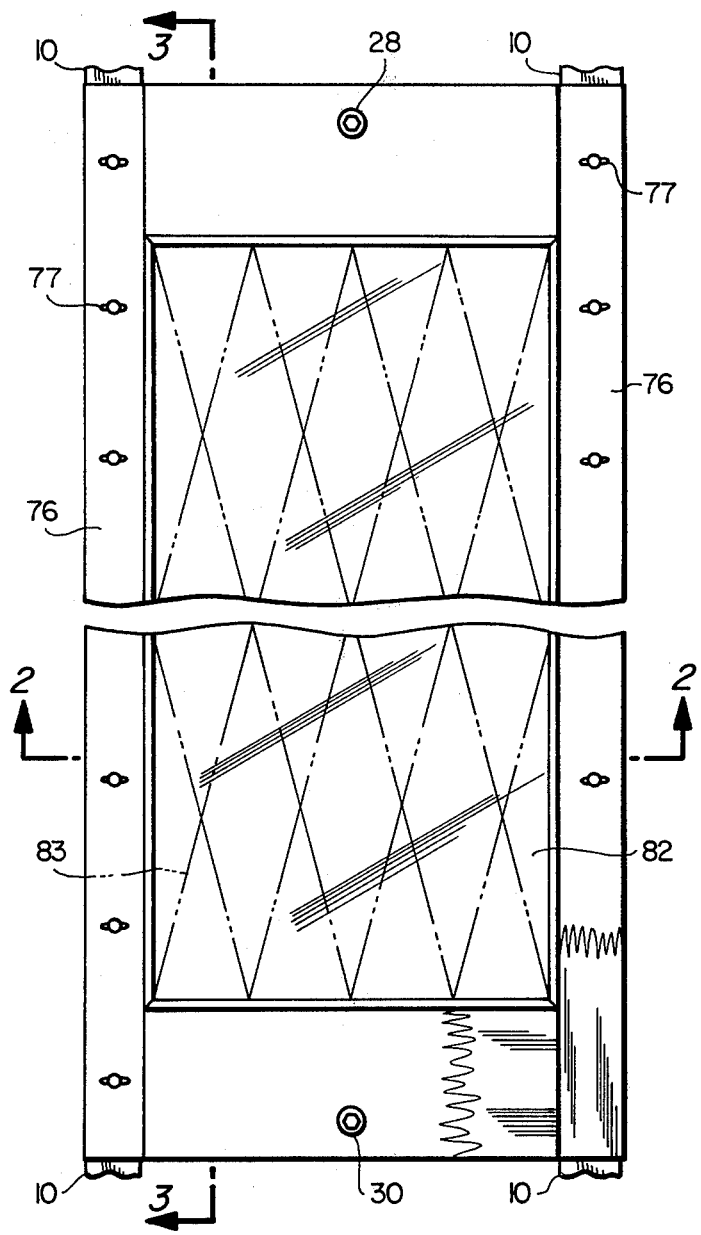
FIG_1
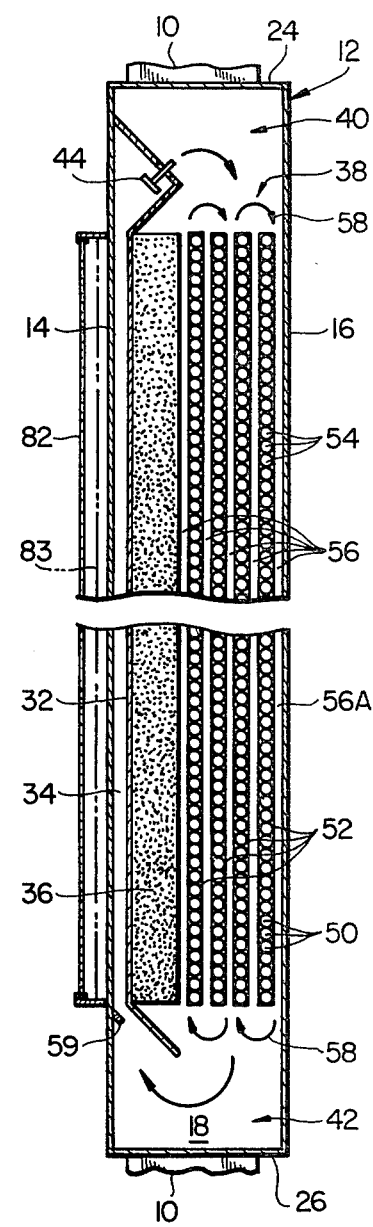
FIG_3
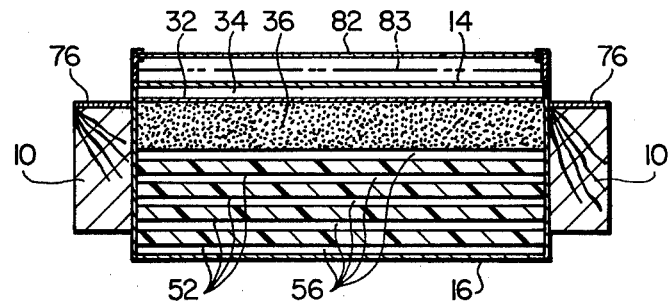
FIG_2

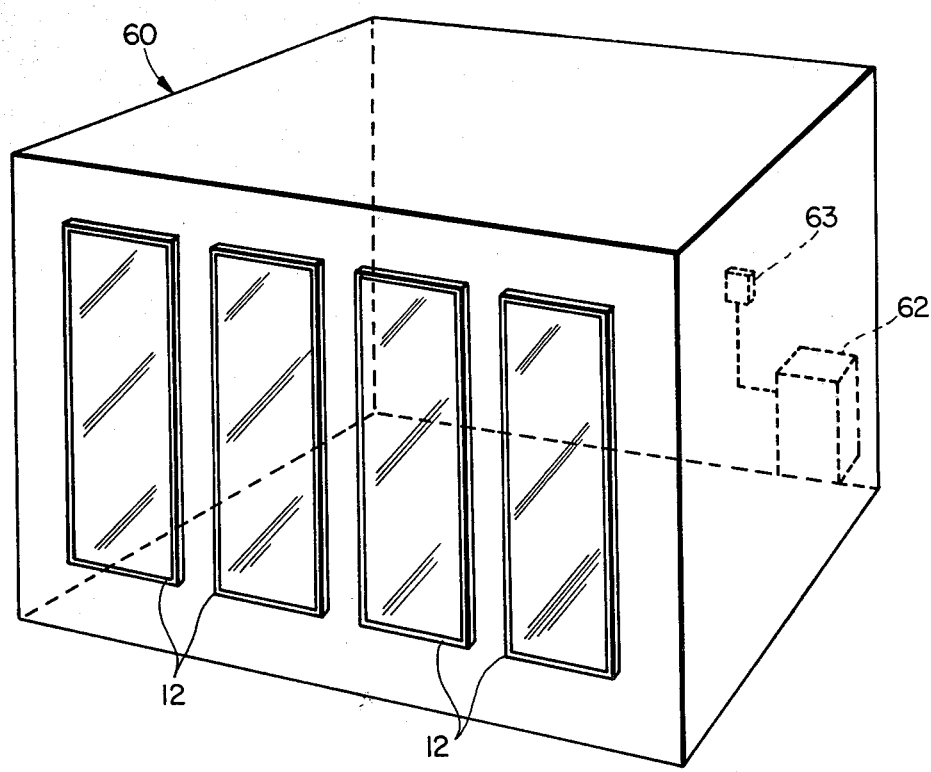
FIG_5
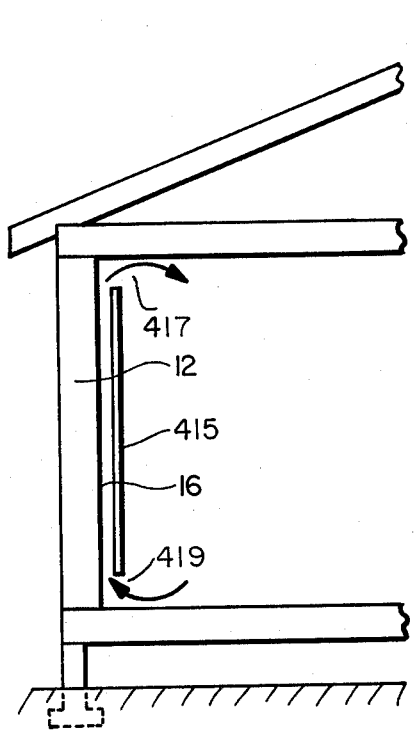
FIG_4
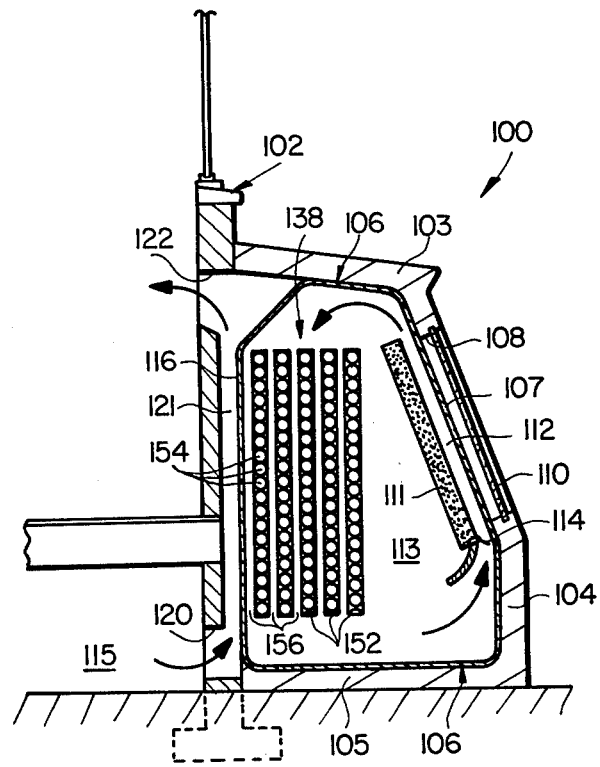
FIG_6

THERMOSIPHON SOLAR SPACE HEATING SYSTEM WITH PHASE CHANGE MATERIALS

TECHNICAL FIELD

This invention relates to solar heating systems, and more particularly to solar space heating systems with phase change energy storage.

BACKGROUND AND PRIOR ART

Recently, there have been many proposals to develop solar heating systems to replace, or at least compliment, conventional heating systems which rely generally on fossil fuels. However, the solar heating systems currently available are more complex and expensive than conventional heating systems. Many solar heating systems currently available must be integrated with conventional systems in order to provide adequate heat control. This usually requires relatively complex piping and controls in order to obtain maximum utilization of heat generated by the solar heating system with minimum reliance on the conventional system.

A primary problem with the current solar heating systems is that they are not packaged in a convenient form for use in conventional building structures or existing building structures, particularly in building walls. Most are roof-mounted units. Usually, they require a solar collector in communication via plumbing or ducting with some type of heat storage means which will store heat absorbed by the system during sunny periods and then release the heat at night or during cloudy days. The devices used for storage are generally heavy and take up a large volume because they store heat in, for example, water or rocks. Due to their great bulk such heat storage devices are usually placed in the basement of buildings or houses which results in high installation costs if the buildings or houses are already built. Even proposals for use of phase change materials provide for bulk remote location storage units in a basement or attic to which the solar heated fluid is piped. Furthermore, losses or inefficiencies result as the fluid travels between the solar collector and storage device.

Since presently available systems often require mechanical and electrical accessories such as valves, pumps, sensors and even small computers for efficient operation, installations with these devices can be expensive and have significant maintenance and reliability problems.

An additional problem with the currently available solar heating systems is that they tend to be architecturally incompatible with both existing buildings and existing building practices, particularly as self-contained wall and roof units. This incompatibility is both aesthetic and structural and is due in part to the design of the collectors which dictates that they are usually attached to the building structure as a type of auxiliary unit rather than being associated in an integral manner with the building structure. Even when integrated into the structure, they usually form part of the roof.

U.S. Pat. Nos. 4,003,367 and 4,055,055 illustrate the application of thermosiphonic principles to the making of a water heater and a boiler based on the collection of solar energy. However, neither of these disclosures are adapted for use as self-contained units and appear limited to the specific application as water heating devices.

U.S. Pat. No. 4,073,284 illustrates the use of a crystalline phase change material in a solar heating device operated by the saturated vapor of a heat carrier which is used to exchange heat with a phase change material having a storage mass capable of absorbing heat energy in the form of latent heat at a temperature just above room temperature. However, the principle of operation relies on the vaporization of a condensate, the pressure of which is regulated by a ducting system which is in communication with a bellows associated with the unit in order to control condensate level. This unit is designed to operate horizontally at ceiling level where heat is not efficiently distributed. In view of the necessity of operating against gravity between a liquid and condensate phases in the heat collection system, the unit appears inherently unsuitable for wall or steep roof locations.

U.S. Pat. No. 4,062,351 discloses a water collection trough panel having inlet and outlet ports connected to a piping system and presumably thence to a storage facility. In one embodiment disclosed in U.S. Pat. No. 4,062,351 (FIG. 19) it is stated that a thermosiphoning process can take place if the unit is tilted up and further it states that a supplemental use of heat retaining crystals can surround the heat transfer pipe in a unit employing fins to assist in exchange of heat from the panel to the material flowing in the transport pipe which presumably leads to a larger heat storage facility. However, the nature of the crystalline material referred to is not disclosed. It is not believed that this panel would be suitable for wall installation in view of the physical arrangements and the employment of the associated piping to take energy away from the panel rather than utilize it in situ. Thus, the unit is not self-contained.

Thus, the prior art as above exemplified fails to solve the basic problem of providing a self-contained unit requiring no external piping and which is architecturally and structurally compatible with both existing conventional buildings in new construction and as an addition thereto in older structures.

OBJECTS OF THE INVENTION

In view of the aforediscussed shortcomings of currently available solar heating units and of the prior art in general, it is an object of the instant invention to provide a new and improved, self-contained, solar space heating system.

It is a further object of the invention to provide an integrated solar heating system in which collection, storage and distribution of energy is accomplished by use of a plurality of self-contained units wherein the adequacy of the system for any given structure is determined by the number of units employed and their distribution around the structure.

It is a further object of the instant invention to provide a new and improved solar heating system in which there is no necessity for transporting solar generated heat between a collector and remotely situated heat storage facility, thereby eliminating piping, ducting, and the like together with their associated controls and the remote storage facility itself.

It is a further object of the instant invention to provide a new and improved solar heating system which is relatively inexpensive to manufacture, install, and which requires no maintenance in operation.

It is a further object of the invention to provide a new and improved solar heating system adapted for use as a wall or tilted roof unit which can be mounted on the studs or framing of a building or house so as to be compatible with existing construction practices and so as to provide an economical substitute for the wall paneling, sheathing, exterior covering and insulation that it displaces.

It is a further object of the invention to provide a new and improved solar heating system which has exterior surfaces that will readily accommodate architecturally attractive features.

It is a further object of the instant invention to provide a new and improved solar heating system which releases its stored energy independently of conventional backup systems in a self-regulating manner so that backup heating will be required only when energy stored by the solar heating system is depleted.

SUMMARY OF THE INVENTION

In the present invention it has been realized that it is possible to select and combine a heat exchange liquid and a phase change material into a unique assembly which forms a unitary solar heating unit adapted for both wall and inclined ceiling construction. In general, the present invention includes a completely enclosed container in which is disposed a heat collection and exchange fluid, preferably liquid. One portion of the container forms an outwardly facing wall adapted to collect solar radiation and for causing the same to be thermally in contact with a heat collection flow channel adjacent the solar heated surface. This channel has a predominantly vertical orientation and is bounded at the rear by an insulation member which defines the rear surface of the channel. The upper and lower ends of the channel are in communication with a storage reservoir located behind the insulation member so that liquid heated in the heat collection flow channel passes upwardly and circulates into the reservoir region by thermosiphonic action. At least one panel of phase change material is located in the storage region and is constructed with a plurality of fully enclosed horizontal channels therethrough for preventing degradation of performance caused by stratification (believed to be caused by non-uniform hydration) vertically within the phase change material. The phase change material is entirely contained within the channels of the panel and physical contact between the liquid in the thermosiphon system and the phase change material is prevented while maintaining thermal exchange. A valve is disposed in the flow path of the heat collecting channel for preventing reverse thermosiphoning when the collection channel temperature is cooler than that in the storage region.

Preferably, a plurality of phase change panels are arranged in spaced relation in the storage region to provide a plurality of flow channels between them so as to achieve a greater storage capacity and efficiency. This also permits internal thermosiphoning between the phase change panels during the period the heat collection channel is shut off, thereby promoting progressive transfer of heat stored in the central region to the back wall of the unit which serves as a heat distributor. The back wall of the panel is adapted for possible direct exposure to a room or its vent ducts or for placement adjacent internal sheathing of above average thermal conductivity; or may be spaced from the internal wall to create a natural convection path with upper and lower vents to the room.

BRIEF DESCRIPTION OF THE DRAWINGS

FIG. 1 is a front view partially cut away showing a single unit of a wall mounted, solar heating system constructed according to the present invention;

FIG. 2 is a horizontal sectional view taken along lines 2—2 of FIG. 1;

FIG. 3 is a vertical sectional view taken along lines 3—3 of FIG. 1;

FIG. 4 is an illustration of the use of the system of FIG. 1 installed in a building wall using naturally created convention currents to distribute heat from the system;

FIG. 5 is a schematic illustration in perspective, showing a plurality of the units of FIGS. 1-3 mounted on the wall of an enclosure or room including an auxiliary conventional heater; and FIG. 6 is a side view partially in section of an alternative embodiment of the invention in combination with an existing building structure.

DETAILED DESCRIPTION OF THE PREFERRED EMBODIMENT

Referring generally to FIGS. 1 through 3, a form of the invention is disclosed which is particularly adapted to be mounted as a wall unit, as for example, between studs 10 which are part of the framing for a building. The unit includes an outer container 12 having front and back walls 14 and 16 and suitably closed about its sides, top and bottom for containing a heat exchange liquid 18 therein in normally sealed condition. In the form shown the unit includes side walls 20 and 22 and top and bottom walls 24, 26. Normally closed upper fill and lower drain plugs 28, 30 are also provided.

The front wall 14 is adapted to be exposed to solar radiation and is therefore constructed in a suitable manner for absorbing and collecting the same. More specifically, the front wall includes means for efficient capture of solar radiation which can, for example, consist of radiation absorptive black paints, suitable frequency selected coatings, and preferably glazing. The back wall 16 is adapted to face inwardly in heat exchange relation to a room and serves to heat the interior thereof by direct convection and radiation or other works of the associated building in which the unit is installed. Thus, the adjacent building member may be flush wall board for conductive radiant heat exchange, or, as shown in FIG. 4, spaced wall board 415 with associated upper and lower wall vents 417, 419, manually or automatically adjustable, for efficient convective heating.

The remaining available volume of the container is filled with a suitable heat transfer or exchange fluid 18 preferably a liquid such as water or water-antifreeze mixture. A gas such as air may be substituted as a secondary medium as will be explained.

Guide means is disposed in the container adjacent the heat collection surface and has a surface 32 facing the same to form therewith a liquid flow channel 34 extending over the area of the front wall solar collection surface. The liquid content filling the channel is heated by proximity to the adjacent solar heated front wall. The submerged guide surface 32 closely conforms to the surface profile of the container's solar collection surface 14 but is spaced a distance away from it so as to permit upward thermosiphoning convection of heated liquid with good heat transfer throughout its depth whenever the heated liquid exceeds the temperature of the liquid mass in general.

An insulating member 36 is also completely submerged in the liquid and is disposed rearwardly of the heat collecting channel toward the rear wall. Together, member 36 and wall 16 define a heat storage region 38 therebetween which is thermally insulated against direct reradiation towards the front aspect. In the system shown, the surface 32 defining the heat collecting channel is also the front surface of the insulating member and is so constructed for convenience and economy. It should be noted that the gap between the front surface of the channel defining means and the front wall of the container need not be very deep in order to effectively capture the heat emanating from the front wall. The heat collecting channel is closed from communication with the storage region on its sides but is open through a top reservoir and passageway 40 at its upper end and a bottom reservoir and passageway 42 at its lower end to form a closed loop so that heated liquid in the channel which tends to rise by thermosiphonic action flows out the upper passageway and into the heat storage region, the cooler liquid in the storage region returning through the lower passageway.

Means is provided for preventing inverse thermosiphoning whenever the volume of liquid in the heat collecting channel is cooler than that of the storage region, such as at night, or after a period of densely cloudy weather, or, anytime after a long period of highly efficient collection. Such means consist of antisiphon valving 44 placed in the collection channel flow path to retard or prevent reverse flow which results in storage energy losses. Such valving can be automated or operate directly off the hydrostatic head created by the liquid temperature difference. For summer months means can be provided for manually overriding and reversing the valve action to provide nocturnal cooling of the storage region for daytime cooling use.

Means is provided for high density storage of heat in the form of a phase change material 50 encapsulated within a member preferably in the form of a panel 52 and disposed within the heat storage region 38. The phase change material is characterized by a high value of the heat of fusion related to solid-to-liquid transition so that the material can store or release a large quantity of thermal energy in latent form on passing this transition. Certain phase change materials not only have a high heat of fusion transition characteristic but also a transition temperature which is appropriately above the desired temperature of the area to be heated to promote effective convective distribution.

Referring particularly to FIGS. 2 and 3, a plurality of panels are shown, all of which are of similar construction. The phase change material itself can be selected from substances with melting temperatures high enough above room temperature to promote efficient convection within the liquid thermosiphonic system. Transition temperatures of the order of 90° F. to 110° F. will provide this feature and are available by selection from any of several of the salt hydrates. In particular, sodium sulphate decahydrate $Na_2SO_4.10H_2O$ is a specific example which works exceedingly well. It has a transition temperature of approximately 90° F.

Such phase change materials are often found to vertically degrade in respect of their thermal and physical characteristics as they are cycled through the liquid-solid phase transition so that their physical properties become vertically non-uniform during use. Such vertical non-uniformity is believed to be caused by non-uniform rehydration when the material is cycled. This limits the material's useful life and can lead to hot spots in the unit. In order to prevent this the panels of the present invention are formed into a planar panel structure in which the phase change materials are sealed and isolated from the heat exchange liquid by an arrangement wherein the panel contains a plurality of small cross-section horizontal channels 54 spaced and sealed from each other and preferably aligned in generally vertically ascending rows. Such a structure can be formed from plastic materials which can withstand the temperatures of operation and have good thermal conductivity and materials compatability. Examples include extrudable linear polyethylene. By the foregoing structural arrangements physical contact between heat exchange liquid and the phase change material is prevented while good thermal exchange still takes place. Preferably a plurality of such panels are arranged in spaced parallel alignment with each other having uniform flow channels 56 therebetween to form a rack of the same occupying a substantial portion of the available space within the heat storage region. These flow channels provide for the passage of heat exchange liquid in intimate contact with both sides of each panel as the same is delivered from the upper passageway and allowed to flow through the heat exchange panels to heat them before returning through the lower passageway to the inlet end of the heat collecting channel.

The relative efficiency of this material is illustrated by the following example. By utilizing four panels containing 130 pounds of such sodium sulfate hydrate, fourteen thousand BTU's at 90° F. can be stored in a package having a volume of 4.3 cubic feet. It would take over three times the volume and three times the weight of water and over five times the volume and eight times the weight of concrete to store fourteen thousand BTU's at 90° F. Consequently, by using such a phase change material great economies are realized in both mass and volume over conventional heat storage arrangements. This allows construction of a very compact and efficient solar heating unit.

Under circumstances in which the solar heating system and panels have exceeded their maximum latent capacity, it is preferred to enhance the cyclic lifetime of the phase change material by employing a flow restrictor by which heated liquid from the heating channel no longer is allowed to freely and efficiently flow into the storage area to further heat the already liquified phase change material. At the same time, the flow restriction also keeps the temperature of the phase change material within comfortable limits. Such a flow restrictor can associated with the antisiphon valve itself or be a separate member 59 disposed at the other end of the channel 34. In connection with the flow through the channel and to the storage region it should be pointed out that in view of the sensitivity of the phase change material to capture energy even at a small degree of temperature rise above its transition temperature, it is found that there is no need to employ conventional flow restricting devices in the channel to raise the liquid temperature significantly above the transition temperature. Moreover, it is to be noted that collection efficiency is normally enhanced by the relatively low temperature elevation of the transfer fluid above the transition temperature, and is discouraged by any substantially higher temperature in the collection channel as would be promoted by any flow restriction. At higher temperature differentials excess energy then tends to be lost, since it is returned to the outside ambient by the way of conduction, convection and radiation from the overheated collector surface. Accordingly, when heating phase change material at the transition temperature, heated liquid is allowed to freeflow into the storage region whereat the temperature is held to the transition temperature until complete liquification of the phase change material takes place.

In operation the solar heating system of the present invention is entirely self-contained and is not intended to operate by connection with any external system. When the phase change material is below its transition temperature and solar energy is heating the liquid in the flow channel adjacent the solar collecting surface, gross thermosiphon flow is induced, by which the heated liquid rises, passes through the antisiphon valving and down through the various passageways or flow channels 56 between the several panels and in heat exchange relation thereto and gradually causes elevation of the temperature of the panels and phase change material to the transition temperature. At the transition temperature the amount of energy which can be absorbed at a given temperature increases in a step function due to the heat of fusion required to liquify the phase change material. Thus, the temperature is stabilized at the transition temperature thereof until sufficient heat has been added to completely liquify all of the material. At this juncture the material will continue to rise in temperature until it reaches thermal equilibrium with the liquid in the solar heated channel 34. Since this may be at a temperature which is higher than desired for the prolonged useful life of the phase change material, the restrictor valve 59 will slow the flow so as to retain the heated liquid in the channel 34 and substantially impede further heating of the panels.

When the temperature in the channel 34 drops below that of the panels in the storage region, reverse flow is prevented by the antisiphon valve 44. Meantime, either during the collection cycle or afterwards, heat is radiated through the interior wall 16 into the adjacent area, be it the room itself through wall board or by convection as previously explained. Gradually the heat emanated from the closest panel to the wall 16 will cause cooling of the liquid in that channel 56A relative to the adjacent channels. Such a condition causes internal thermosiphoning among the panel channels 56 themselves as shown by the arrows 58. This tends to equalize the temperature among the panels. Thus, thermosiphoning takes place as the motivating force to move the heat transfer or exchange liquid both during collection of thermal energy and in the exchange of thermal energy to the interior environment of the building. It should be noted that in selecting a phase change material with a transition temperature somewhat higher than the desired room ambient, thermosiphoning only occurs and causes an exchange of energy when there is an effective difference in temperature between the two. In this way, the unit tends towards self-regulation because if the temperature difference gets smaller then the amount of internal thermosiphoning tends to decrease as thermal equilibrium is approached. However, if the temperature difference is large then the amount of internal thermosiphoning picks up and the exchange of energy proceeds at a greater rate.

FIG. 1 particularly illustrates one form of installation in which the solar collector unit just described is so configured so as to be mounted between studs 10 which are part of the framing for a building, the solar heating unit 12 is encased in and formed as a galvanized steel enclosure which has a pair of side mounting flanges 76 extending therefrom. The flanges 76 have a plurality of slots 77 therein which receive nails, screws or the like therethrough to secure the unit 12 to the studs 10. The enclosure preferably is either fourteen inches wide or twenty-two inches wide so as to fit between stud spacings which are either sixteen inches on center or twenty-four inches on center. The container may be forty-eight inches high to form a half panel or eighty-four inches high to form a full panel. While a single panel is shown in place between a pair of studs, it should be kept in mind that the system contemplates using a plurality of panels such as is schematically shown in FIG. 5 in order to provide sufficient space heating; the number and placement of which is selected in accordance with localized structural energy requirements and available solar exposure.

In order to protect the collector surface 14 from the elements, to encourage collection efficiency, and to define the exterior appearance of the collector unit 12, glazing 82 may be disposed over the collector surface 14 in spaced relation thereto. The glazing 82 may be of glass, plastic or any other material which will readily transmit insolation through to the collector surface 14. If desired, decorative mounting bars 83 may be disposed between the glazing 82 and the collector surface 14.

As used herein the term thermosiphoning has been given in its usual meaning with respect to liquid systems. However, it should be understood that fluid systems in general will work on a similar principle. In particular, a gas phase heat transfer fluid may be substituted for liquid provided the sacrifice in performance could be offset by its lower cost and weight. Accordingly, the terms fluid and/or liquid as used herein include both gaseous and liquid phase materials and the term thermosiphoning includes convection of liquids or gases in heat channels. In case of use of a gas, i.e., air, the upper drain plug would be made of porous materials such as broadcloth to allow for gas expansion and contraction.

Accordingly, whether liquid or gas fluid is used as a heat transfer medium the present application will refer to the heat driven force which causes circulation of the fluid 18 as caused thermosiphoning, although for gaseous medium, it might be otherwise described as convection. Herein, these terms are to be taken as interchangeable, at least in the broad sense.

FIG. 5 shows a system for space heating a building 60 by using a plurality of solar heating units 12 in conjunction with a conventional non-solar heating system 62. The heater 62 is controlled by a regulator 63 which is, for example, a thermostat. As is readily seen in FIG. 5, there is no direct link between the conventional heater 62 and the unit 12 other than the radiant and convective input that both the heater 62 and the units 12 have to the regulator 63. Consequently, the complexity usually associated with solar heating systems is avoided. Essentially, this system functions in a similar fashion to the usual arrangement in which solar energy is admitted through windows into the interior of a house and warms the air within the house by means of a combination of radiant, conductive and convective heating. With the instant invention, the energy is transmitted into the house by the units 12 rather than through windows. The great advantage comes because the phase change material is able to store energy and release that energy over a long period of time both as it cools to solidification or phase change temperature and as it changes phase from the liquid state to solid state at that phase change temperature. By setting the regulator 63 so that the heater 62 produces supplemental heat whenever the room temperature comes below a predetermined level, one can rely on the units 12 for most of the building's heat and utilize heater 62 simply as a backup.

The arrangement schematically shown in FIG. 5 allows for a system which provides self-regulating energy distribution in which the rate of exchange of energy from the heat storage portion of the unit 12 to the building 60 is nearly proportional to the temperature difference between the interior of the building and the storage portion. Consequently, a storage temperature which is by design close to the desired temperature within the building will offer a rate of exchange that is sensitive to changes in the temperature within the building. Equilibrium is reached when gains in the interior building temperature through convection from storage are balanced by the building's insulation and infiltration losses. Proper design regarding the number of solar units 12 serving given spaces, the air flow of convection loops, the use of vent dampers and/or the use of backup heating systems 62 will determine the comfort and efficiency of the system.

Referring now to FIG. 6, there is shown a second embodiment of a thermosiphon solar collecting unit 100 designed in accordance with the principles of the instant invention. Unit 100 rests on the ground preferably adjacent the south side of a building 102 so as to receive a maximum amount of insolation. The unit 100 includes an enclosure formed of a top wall 103, side wall 104 and floor 105, each of which includes substantial insulating material so as to retain heat within the enclosure. A container 106 is positioned within the enclosure and has a collector surface 107 thereupon which registers with a window 108 through the side wall 104. The collector surface 107 is protected by glazing 110 to increase efficiency and so that it will not be corroded or harmed by the elements. Behind the collector surface 107 there is a block of insulation 111 which is spaced from the collector surface to provide a heat collecting flow channel 112 through which a liquid 113 filling the container 106 flows.

At the bottom of the channel 112 there is an antisiphon valve 114 which prevents flow of the liquid 113 down through the channel 112 in the evening or during very cloudy periods when the collector surface 107 is not heating liquid in the channel 112 but is rather cooling liquid in the channel. The liquid is circulated by a thermosiphon effect which causes warmed liquid to rise in the channel 112 and to exit from the channel at the top of the container 106 while cool liquid is drawn in through the antisiphon valve 114 and is warmed causing it to rise in the channel 112. As it circulates, the liquid 113 transfers heat energy to phase change material panels 152 through channels 156, such as have been previously described.

Some of that energy is dispensed through the rear wall 116 of container 106 into the building 102 during the day while much of the energy is retained within the liquid 113. During the evening hours or during very cloudy periods heat energy stored in the liquid 113 is released through the container 106 into the building 102 as the panels 152 and liquid 113 cools.

In the illustrated embodiment, unit 100 is disposed adjacent a return air plenum 115 which may be a crawlspace modified to form a plenum, a series of air return ducts, formed from joists, or conventional sheet metal ducting. Relatively cool air accumulates in the plenum either by gravity convection or fan forced air. An opening 120 in the plenum 115 registers with channel 121 between the building wall and the rear wall of the container 106. Heat in the storage region 138 and panels 152 is conducted through the container 106 and heats air in channel 121 causing air to rise and enter the building 102 through a wall vent 122. The wall vent may be connected to ducts which take the warm air to the upper portion of the building 102 from whence the warm air begins to cool and sink to the lower portions of the building thereby warming the building. The now cool air returns to the plenum 155 and enters the channel 121 through inlet 120 to be heated again.

The system may be used to cool a building 102 during summer months by providing antisiphon valve 114 with a reversing override which would allow relatively warm liquid within container 106 to circulate in the opposite direction during cooler evening hours wherein it flows down the channel 112 between the submerged insulation 111 and the collector surface 107 which now functions as a radiator to remove heat from the liquid. When the unit 100 is used in this fashion, then the collector surface should be shuttered or shaded in some manner to prevent heating during daylight hours. By utilizing a fan (not shown) to move cool air from the plenum 115 past the cool surface 116 to the top of the house where the air can drop down through the house and into the duct 122 an air conditioning system is effected to cool the building 102.

The embodiment of FIG. 6 is particularly attractive for mass retrofit applications to existing structures because it does not necessarily involve substantial modification of those structures.

To those skilled in the art to which the invention pertains, many modifications and improvements will occur without departing from the spirit and scope of the invention. For example, the flow restriction function 59 could be accomplished by a thermosensitive coating on the glazing 82 or absorber plate 14 wherein such coating would undergo an optical change from a transmissive or a dark condition to a light reflective state just above the phase change temperature to reduce further solar collection. Also, in climates where it is desired to enhance the cooling function, a phase change material with significant latent heat of fusion and a melting point in the region of 60° F. can be incorporated into the panels either in whole or in part together with appropriate reversing valves to establish the desired direction of thermosiphon action. Thus, while particular embodiments of the present invention have herein been illustrated and described, it is not intended to limit the invention to such disclosure, but to include such changes and modifications within the scope of the following claims:

I claim:

1. In a unitary heating system for heating an adjacent area, a heat transfer liquid, a container for holding the liquid and having a front wall forming a solar heat collection surface and a rear wall forming a heat dispensing surface, said walls being in substantially spaced relation to each other to define an interior volume within said container, guide means is disposed in the container adjacent the heat collection surface to form therewith a heating channel between said surface and said means through which channel the liquid to be heated flows by thermosiphonic action, insulation means disposed adjacent said guide means and spaced from the rear wall of said container to define and form a heat storage region on the other side thereof, means forming flow pathways in communication with the upper and lower portions of said heating channel to connect the same with said storage region so that heated liquid can circulate from the channel to the storage means and return in a closed system, said heat storage region being in contact with the rear wall of said container through which heat is to be dispensed to the adjacent area outside of said container and in thermal contact therewith, means for predominantly vertically orienting said heating channel and heat storage region with the upper, outlet end of the heating channel disposed above the lower, inlet end of the heating channel to cause thermosiphonic flow between the same whenever the heating channel is at a higher temperature, at least one panel containing phase change materials located in the storage region and constructed with a plurality of fully enclosed horizontal channels therethrough in spaced relation to each other, a phase change material disposed in each of said channels, said phase change material selected to change from a solid to a liquid at a predetermined threshold temperature rise, said panel defining the enclosure means for the phase change material being so constructed and arranged as to exclude physical contact between said heat transfer liquid and said phase change material but to permit thermal exchange therebetween, and control means disposed in the flow path of the collection channel for preventing reverse thermosiphoning when the collection channel temperature is cooler than a predetermined temperature equal to or greater than phase change temperature.

2. The solar heating system of claim 1 in which said control means comprises
  valve means positioned in the flow path through the heating channel for closing the same to prevent the liquid from reversing the direction of thermosiphonic flow when the heat collection surface is not receiving sufficient insolation from the sun to heat the liquid in the heating channel to a temperature greater than that of the liquid in the storage region.

3. Solar heating system of claim 1 wherein the phase change material changes from a solid to a liquid above approximately 90° F.

4. The solar heating system of claim 1 wherein said system is incorporated in a building wall, and further including means forming a convection space between an interior wall member thereat and said back wall, said means including air inlet and outlets connecting said space to said room.

5. The solar heating system of claim 1 wherein said panel of phase change material is disposed behind the insulation means to form at least two heat storage channels behind the insulation means through which the liquid flows when transferring heat during allowed thermosiphon flow and in which the phase change material is stored.

6. The solar heating system of claim 1 further comprising:
  a plurality of panels of phase change material disposed behind the insulation means and in the heat storage region in spaced relation to each other to form a plurality of heated liquid flow channels dispersed throughout said panels.

7. The solar heating system of claim 1 wherein the threshold temperature of the phase change material is approximately 90° F.

8. The solar heating system of claim 1 wherein the transition temperature of the phase change material is in the range of approximately 80° F. to 110° F.

9. The solar heating system of claim 1 wherein the phase change material is $Na_2SO_4.10H_2O$.

10. A solar heater as in claim 1 further including a flow restrictor means disposed in the flow path of said collection channel to restrict the flow therein whenever the temperature of the storage means and of the phase change material exceeds a predetermined value higher than the phase change temperature in order to prevent excess temperature rise from causing thermal damage to said phase change material.

11. In a solar heating system; a thermosiphon heat exchange liquid, a container for holding the liquid, means for continually exposing said liquid to a solar heated surface, means for establishing a heat collecting flow channel adjacent the solar heated surface and having at least a partially vertical orientation so that as the liquid therein is selectively heated it rises due to thermosiphon action, means forming a heat storage region for receiving heated liquid from said flow channel, said container further including back wall means for dispensing heat from the storage region to an area to be heated, insulation means disposed between said flow channel and said storage region, a plurality of panels of phase change material located in the storage region and constructed with a plurality of fully enclosed horizontal channels therethrough in spaced relation to each other, said phase change material changing from a solid to a liquid at a predetermined threshold temperature rise and contained within said channels of said panel, the latter being so constructed and arranged to exclude physical contact between said liquid and said phase change material but to permit thermal exchange therebetween, means for supporting said panels in spaced alignment with respect to each other in generally parallel planes so that internal thermosiphoning occurs as the panels nearest the back wall become cooler than more remote panels, control means disposed in the flow path of the collection channel for preventing reverse thermosiphoning when the collection channel temperature is cooler than a predetermined value equal to or greater than phase change temperature.

12. The solar heating system of claim 1 or 11 wherein the control means includes valve means which open only when the temperature of the liquid is at least equal to the transition temperature of the phase change material.

13. The solar heating system of claim 1 or 11 further comprising:
  top reservoir means disposed above the panel means and registered with the outlet end of the heating channel, the top reservoir means being registered with the heat storage channels for receiving heated liquid from the heating channel.

14. The system of claim 1 or 11 wherein the part of area is an enclosure and wherein solar heating system comprises a plurality of individual units mounted in the walls of the enclosure.

15. The heating system of claim 14 wherein the enclosure is a building framed with studs and wherein solar heating system includes a plurality of units mounted between the studs with the solar collectors thereof facing outside the building and the heat transfer surfaces facing into the building.

16. The heating system of claim 15 wherein the individual units are fourteen inches wide so as to fit between studs that are on sixteen inch centers.

17. The heating system of claim 15 wherein the individual units are twenty-two inches wide so as to fit between studs which are on twenty-four inch centers.

18. A solar system for heating an enclosed space in accordance with the system of claims 1 or 11, further including a supplemental heater energized by electricity or fossil fuel for supplying supplemental heat to the space; and a regulator connected only to the supplemental heater for causing the supplemental heater to add heat to the space when the heat supplied by the solar heating means is insufficient to maintain the temperature of said space above a predetermined level, and wherein the regulator includes temperature sensing means set at the predetermined level for monitoring the temperature of the space and activating the regulator.

19. In a solar heating system; a thermosiphon heat exchange fluid, a container for holding the fluid, means for continually exposing said fluid to a solar heated surface, means for establishing a heat collecting flow channel adjacent the solar heated surface and having at least a partially vertical orientation so that as the fluid therein is selectively heated it rises due to thermosiphon action, means forming a heat storage region for receiving heated fluid from said flow channel, said container further including back wall means for dispensing heat from the storage region to an area to be heated, insulation means disposed between said flow channel and said storage region, at least one panel of phase change material located in the storage region and constructed with a plurality of fully enclosed horizontal channels therethrough in spaced relation to each other, said phase change material changing from a solid to a liquid at a predetermined threshold temperature rise and contained within said channels of said panel, the latter being so constructed and arranged to exclude physical contact between said fluid and said phase change material but to permit thermal exchange therebetween, means associated with the collection channel for preventing reverse thermosiphoning when the collection channel temperature is cooler than that in the storage region.

20. A solar heating system as in claim 19 wherein said fluid is a gas.

21. A solar heating system as in claim 20 wherein said gas is air.

* * * * *